United States Patent
Carlsson et al.

(10) Patent No.: US 10,236,943 B2
(45) Date of Patent: Mar. 19, 2019

(54) DISTRIBUTED ANTENNA COMBINING

(71) Applicant: Telefonaktiebolaget LM Ericsson (publ), Stockholm (SE)

(72) Inventors: Torsten Carlsson, Lund (SE); Anders Carlsson, Lund (SE); Christer Östberg, Staffanstorp (SE); Andres Reial, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/753,445

(22) PCT Filed: Aug. 20, 2015

(86) PCT No.: PCT/EP2015/069147
§ 371 (c)(1),
(2) Date: Feb. 19, 2018

(87) PCT Pub. No.: WO2017/028925
PCT Pub. Date: Feb. 23, 2017

(65) Prior Publication Data
US 2018/0241441 A1 Aug. 23, 2018

(51) Int. Cl.
*H04B 7/024* (2017.01)
*H04B 7/022* (2017.01)
(Continued)

(52) U.S. Cl.
CPC ............. *H04B 7/024* (2013.01); *H04B 7/022* (2013.01); *H04B 7/0842* (2013.01); *H04B 7/10* (2013.01)

(58) Field of Classification Search
CPC ...... H04B 7/024; H04B 7/022; H04B 7/0842; H04B 7/10
See application file for complete search history.

(56) References Cited

U.S. PATENT DOCUMENTS

2007/0041464 A1 2/2007 Kim et al.
2009/0238250 A1 9/2009 Kangas et al.
(Continued)

FOREIGN PATENT DOCUMENTS

EP 2258052 B1 7/2011
WO 2011103919 A1 9/2011
WO 2014206461 A1 12/2014

OTHER PUBLICATIONS

Obara, T. et al. Joint Fixed Beamforming and Eigenmode Precoding for Super High Bit Rate Massive MIMO Systems Using Higher Frequency Bands, 2014 IEEE 25th Annual International Symposium, Washington, D.C. on Sep. 2-5, 2014 (pp. 1-5).
(Continued)

*Primary Examiner* — Dac V Ha
(74) *Attorney, Agent, or Firm* — Coats & Bennett, PLLC

(57) ABSTRACT

A receiver (10) featuring a distributed antenna combining system performs two stages of antenna combining. An antenna array (30) receives (102) L streams, or information flows, from UEs (20), and outputs antenna signals on N antenna ports. N parallel radio receivers (40) frequency convert (104) the N received signals to baseband. A first antenna combining circuit (50) applies (106) a relatively low-complexity form of antenna combining (e.g., MRC) to the N radio signals to generate K streams of virtual information. A second antenna combining circuit (60) applies (108) a relative high-complexity form of antenna combining (e.g., IRC) to the K virtual streams to generate L information streams. In one embodiment, antenna elements may have different polarization directions, and the first antenna combining circuit (50) generates two, differently-polarized virtual information streams for each UE (20) stream.

19 Claims, 4 Drawing Sheets

(51) Int. Cl.
*H04B 7/08* (2006.01)
*H04B 7/10* (2017.01)

(56) References Cited

U.S. PATENT DOCUMENTS

| | | |
|---|---|---|
| 2010/0254353 A1 | 10/2010 | Jalali |
| 2011/0103504 A1 | 5/2011 | Ma |
| 2011/0216845 A1* | 9/2011 | Nakao .................. H04B 7/0413 |
| | | 375/295 |
| 2011/0249588 A1 | 10/2011 | Petersson et al. |
| 2013/0039203 A1* | 2/2013 | Fong ..................... H04B 7/024 |
| | | 370/252 |
| 2014/0038619 A1* | 2/2014 | Moulsley ............... H04B 7/024 |
| | | 455/446 |
| 2014/0376600 A1 | 12/2014 | Kosakowski et al. |
| 2015/0139112 A1 | 5/2015 | Park et al. |
| 2018/0102888 A1* | 4/2018 | Tang .................... H04L 5/0023 |

OTHER PUBLICATIONS

LG Electronics: "RS design enhancements for supporting EB and FO-MIMO", 3GPP Draft; R1-144047, 3RO Generation Partnership Project (3GPP), Mobile Competence Centre; 650, Route Des Lucioles ; F-06921 Sophia-Antipolis Ceoex ; France, vol. RAN WG1, No. Ljubljana, Slovenia; Oct. 6, 2014-Oct. 10, 2014 Oct. 5, 2014 (Oct. 5, 2014).

* cited by examiner

DISTRIBUTED ANTENNA COMBINING

TECHNICAL FIELD

The present invention relates generally to wireless communication receivers, and in particular to a receiver featuring distributed antenna signal combining.

BACKGROUND

Ever-increasing data rates and bandwidth are central to the continued evolution of wireless communication networks. Current cellular access systems operate at radio frequencies where the path loss between User Equipment (UE) and a base station is sufficiently low that a static antenna configuration can adequately cover a complete cell or sector.

Future systems will require much more data to be communicated over the air interface. The only cost-effective way to accomplish this is to employ higher radio frequencies, which have sufficient bandwidth for high bit rate communication. To achieve sufficiently low path loss and spatial isolation, large antenna arrays will be used in the uplink (i.e., communications from UEs to the base station). These arrays have a large number of antenna ports, where data signals are communicated via each port. An antenna combining device will transform antenna port information to UE information streams, also referred to as layers, by linearly combining signals from different antenna ports. As used herein, a "layer" or information "stream" may refer to data flows from different UEs to the base station, several data flows from a single UE (e.g., MIMO communications), or a mixture of the two.

The antenna combining device will have the task to transform information from N antenna ports to L information layers. To enable good spatial selectivity, the number L must be significantly smaller than N. The antenna combining device attempts to achieve orthogonality between information flows from the different layers. This orthogonalization is achieved by utilizing spatial selectivity of the array and is typically called beam forming. The combining must be dynamic to adapt to changes in the environment over time.

Several known methods exist to implement such an antenna combining device. One approach relies on measured radio paths between all possible transmit and receive antenna pairs. Based on this information, different algorithms exist to implement antenna combining, depending on how the combining weights for the antenna ports are selected. Maximum Ratio Combining (MRC) effectively matches the receiver to the composite propagation channel of a given layer, and thereby maximizes the received power at the receiver. This is achieved by applying the conjugate of the spatial channel response, which is computationally simple but suboptimal in the presence of interference. Interference Rejection Combining (IRC) optimizes the Signal to Interference and Noise Ratio (SINR) of a layer considering the presence of other layer signals, steering both lobes and nulls in the array directivity diagram in appropriate directions. Performance is significantly increased, but an inversion of the signal covariance matrix is required, which has a high complexity for large antenna arrays.

IRC combining is optimal for extracting individual layer signals. However, this requires fully parallel implementation of all analog and digital circuits between the antenna elements and the combining circuits, which has a negative impact on cost, power consumption, and the dimensioning of interfaces. It is known to physically separate base station circuits, with circuits closest to the analog radio functionality having lower computational capacity than centrally-located baseband processing resources, which may service multiple radio devices. Due to the computational complexity of IRC combining—such as matrix inversion when using a large number of antenna ports—the processing should be performed by baseband computing resources. However, this requires large amounts of data to be transferred from the antennas to the baseband processors. Alternatively, MRC combining, which is not as computationally demanding, may be implemented in the radio receivers closer to the antennas. However, when signals from several UEs or layers are simultaneously received by the antenna array, the receiver performance of MRC combining is inferior to IRC solutions.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a distributed antenna combining system performs two stages of antenna combining. An antenna array receives L streams, or information flows, from UEs, and outputs antenna signals on N antenna ports. N parallel radio receivers frequency convert the N received signals to baseband. A first antenna combining circuit, which may in some embodiments be located proximate to the radio receivers, applies a relatively low-complexity form of antenna combining (e.g., MRC) to the N radio signals to generate K streams of virtual information. The second antenna combining circuit, which may in some embodiments be located in a baseband section of the receiver and not necessarily proximate to the first antenna combining circuit, considers the K streams of virtual information as K virtual antenna ports, and applies a relatively high-complexity form of antenna combining (e.g., IRC) to the K virtual antenna ports to generate L information streams. In some embodiments, both the first and second antenna combining circuits may be in the baseband section.

One embodiment relates to a method of receiving and processing communication signals from UEs in a receiver operative in a wireless communication network. Signals, representing a plurality (L) of information streams transmitted by one or more UEs, are received on the same radio frequency at an antenna array comprising a plurality of antenna elements and outputting signals from a plurality (N) of antenna ports. Each antenna port is connected to one or more antenna elements. The outputs of the N antenna ports are frequency converted to baseband in a plurality (N) of parallel radio receiver circuits. Outputs of the N radio receiver circuits are linearly combined at a first antenna combining circuit to generate a plurality (K) of streams of virtual information. The K streams of virtual information are linearly combined at a second antenna combining circuit into L information streams.

Another embodiment relates to a receiver operative in a wireless communication network. The receiver includes an antenna array comprising a plurality of antenna elements and outputting a plurality (N) of antenna ports. Each antenna port is electrically connected to one or more antenna elements. The receiver also includes a plurality (N) of parallel radio receiver circuits, each connected to an antenna port and operative to frequency convert the output of the port to baseband. The receiver further includes a first antenna combining circuit operative to linearly combine the outputs of the N radio receiver circuits to generate a plurality (K) of streams of virtual information. Finally, the receiver includes a second antenna combining circuit operative to linearly combine the K streams of virtual information into L information streams.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

Some distributed antenna signal processing is known in the art. WO 2014/206461 discloses a radio network node having an Antenna Array System including an Antenna Base Band processor, and a Central Base Band processing unit. WO 2011/103919 discloses a network node having an even number of antenna ports, each associated with a corresponding polarization, beamwidth, and base center. US 2015/0139112 discloses a channel state information reporting method for UE to separately report CSI for vertical and horizontal antenna ports. US 2011/0103504 discloses a method of synthesizing virtual antennas from a single physical antenna, and communicating a preferred antenna down tilt using a pre-coding control indicator, 3GPP TSG RAN WG1 Meeting #78bis. Ljubljana, Slovenia, 6-10 OCT. 2014, "RS design enhancements for supporting EB and FD-MIMO" disclosed enhancements to CSI-RS and other RS to support elevation beamforming and full-dimension MIMO.

For simplicity and illustrative purposes, the present invention is described by referring mainly to exemplary embodiments thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
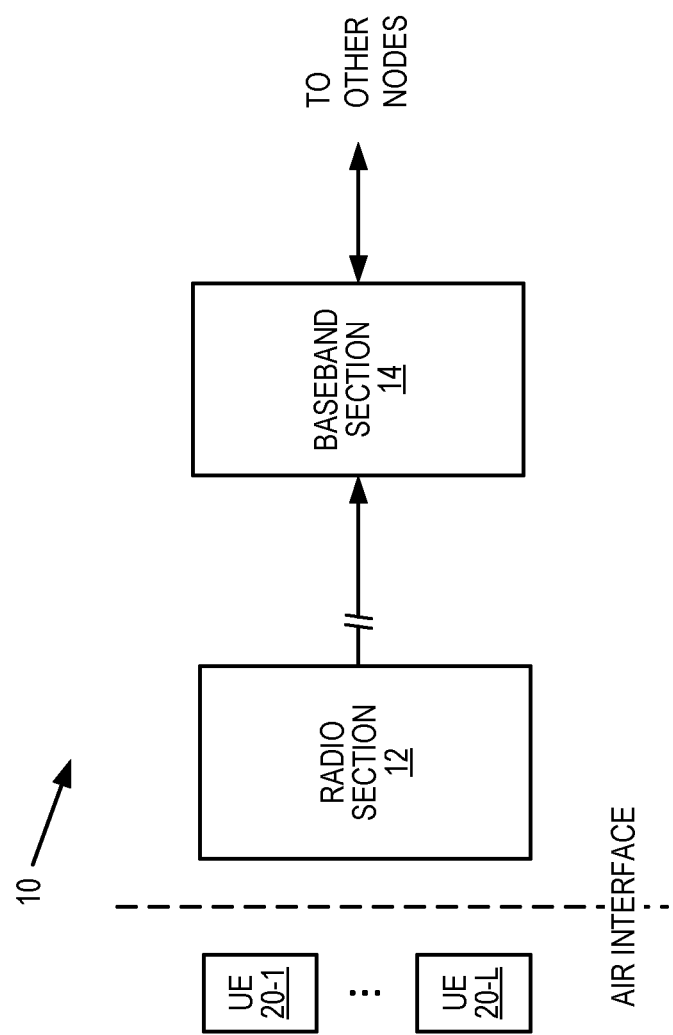
FIG. 1 is a high level block diagram of a receiver.

FIG. 1 is a high level functional block diagram of a receiver 10 operative in a wireless communication network. For example, the receiver 10 may be deployed in a base station node of the network. The receiver 10 may be part of a transceiver (not shown) sharing at least some components with a transmitting function; only the receiver portion 10 is discussed herein. A plurality of UEs 20, which are spatially separated within a cell, transmit on uplink channels to the receiver 10. The receiver 10 comprises one or more radio sections 12 and a baseband section 14. The radio section 12 comprises analog radio components, such as an antenna array, and accompanying amplification and signal processing circuits. The physical location of the radio section 12 is determined by the required placement of the antenna array (e.g., high on a tower or other structure). Accordingly, the radio section 12 is characterized by limited space and power, and by limited computational resources such as processors, memory, communication interfaces, and the like. The baseband section 14 of the receiver 10 includes signal processing and data handling circuits that need not be located proximate the radio section 12. Accordingly, the circuits comprising the baseband section 14 may be rack-mounted in an environmentally controlled location, and may be characterized as not constrained in terms of available power, computational resources, memory, communication interfaces, and the like. Data may be transferred from the radio section 12 to the baseband section 14 by any of a variety of well-known data transfer interfaces (e.g., copper wire, optical fiber, WiMAX, and the like). A typical cell may have a plurality of radio sections 12 connected to a single, central baseband section 14.

Figure 2:
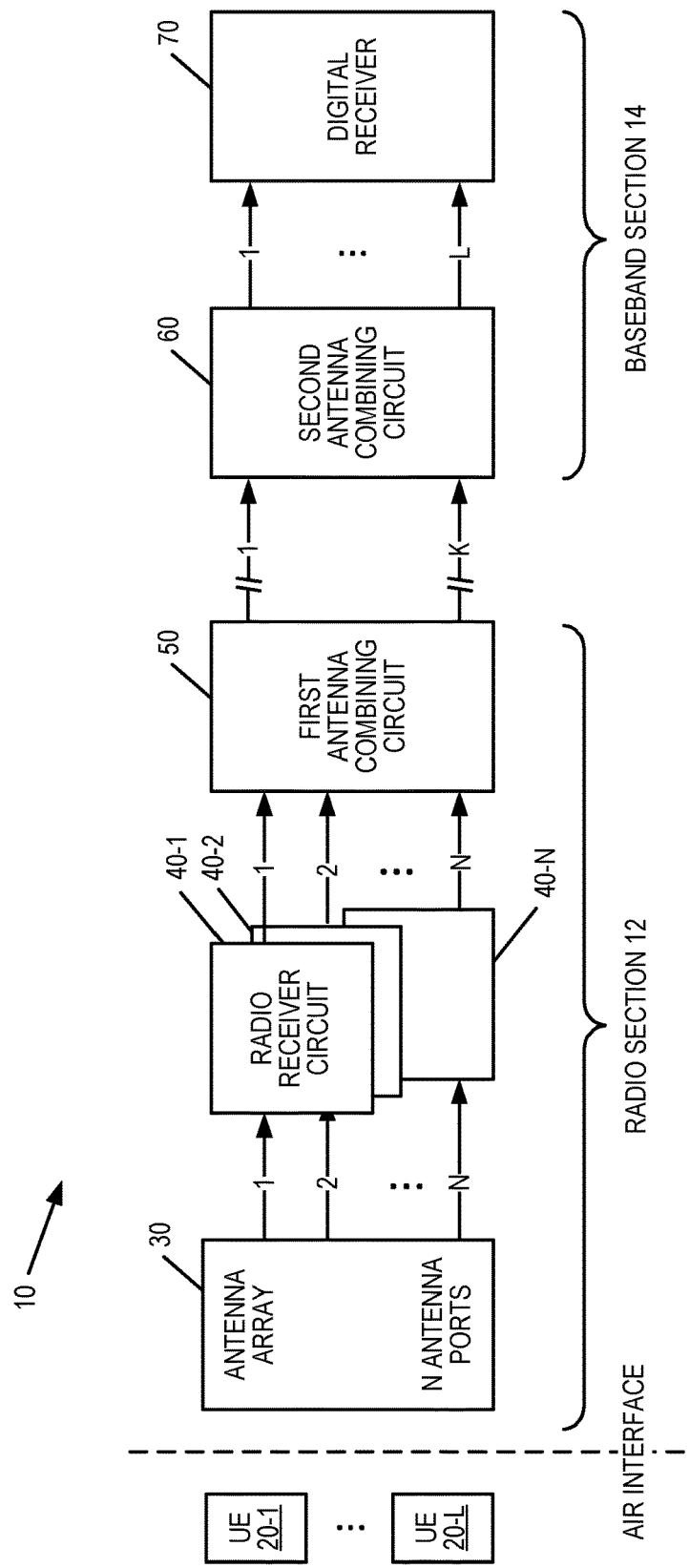
FIG. 2 is a functional block diagram of the receiver of FIG. 1.

FIG. 2 depicts a more detailed view of the receiver 10. The receiver 10 includes an antenna array 30, radio receiver circuits 40, a first antenna combining circuit 50, a second antenna combining circuit 60, and a digital receiver 70. In some embodiments, the antenna array 30, radio receiver circuits 40, and first antenna combining circuit 50 comprise the radio section 12 of the receiver 10, and are preferably physically located proximate to each other. The second antenna combining circuit 60 and digital receiver 70 may comprise the baseband section 14 of the receiver 10.

FIG. 2 depicts L spatially separated User Equipment (UE) 20-1, 20-2, . . . , 20-L transmitting both reference (also known as pilot) and user information symbols modulated onto a shared radio carrier frequency in one or more uplink channels of a wireless communication network. For convenience and ease of explanation, the L UEs are considered to each transmit a single information stream (also referred to as a layer). However, in general, a single MIMO UE may transmit multiple streams, so the L information streams need not necessarily correspond to L UEs. Another simplifying assumption is that all L UEs communicate using the full information bandwidth. In some cases, UEs may share bandwidth by splitting the full bandwidth. In this case, the antenna combining circuits 50, 60 become more complex.

The antenna array 30 comprises a large number of antenna elements, each operative to receive the RF carrier. The number of antenna elements in the array 30 can be very large; for higher frequencies it may be feasible and necessary to have hundreds of antenna elements in an array 30 to achieve the required antenna gain and spatial selectivity. With a large number of antenna elements, it is possible to create different radio channels to spatially separated UEs that can communicate on the same radio frequency. As discussed more fully below, often large antenna arrays 30 consist of cross-polarized antenna element pairs at each element location. These provide independently-faded versions of the transmitted signals. The antenna array 30 outputs N antenna signals on N antenna ports. In general, two or more antenna elements may be electrically connected to one antenna port, so the number of ports in an antenna array 30 does not necessarily correspond to the number of antenna elements. In general, $N \gg L$.

The antenna signals output on the N antenna ports of the antenna array 30 are processed by N parallel radio receiver circuits 40-1, 40-2, . . . , 40-N. Processing may include, e.g., low-noise amplification, ADC, frequency down-conversion to baseband, analog and/or digital filtering, and the like, as well known in the art.

The first antenna combining circuit 50 assumed in some embodiments to be collocated with the antenna array 30 and N parallel radio receiver circuits 40 applies a relatively low-complexity combining algorithm to the N antenna signals output by the N radio receiver circuits 40. For example, in one embodiment the first antenna combining circuit 50 may initially estimate the radio channel between each UE 20 and antenna port in the antenna array 30. In another embodiment, the first antenna combining circuit 50 may use the same channel estimate for more than one antenna port, utilizing a known or estimated phase difference between the antennas. In estimating the radio channel, the first antenna combining circuit 50 preferably analyzes reference signals that are transmitted by the UEs 20 prior to user data. In this manner, the amount of user data that must be buffered at the first antenna combining circuit 50 is minimized or eliminated. Alternatively, the reference signals may be transmitted in parallel with the user data, and some user data is buffered, if necessary. The radio channel estimates define how to transform the N antenna signals into K virtual information streams. In one embodiment, the first antenna combining circuit 50 applies a Maximum Ratio Combining (MRC) algorithm, e.g. by multiplying each received antenna signal with the conjugate of the corresponding radio channel and then integrating the signal over all antennas. For each virtual information stream, MRC processing optimizes the signal level between one transmitted stream and the receiver 10. Once the antenna combining transform is defined by using reference signals, it may be applied to received user data.

In another embodiment, the first antenna combining circuit 50 instead applies a low complexity variation of an interference suppression algorithm, such as Interference Reduction Combining (IRC) using only one or a few interfering signals. In this embodiment, the covariance matrix inversion may be performed in a simple manner, such as by using the well-known rank-1 update technique, using the Sherman-Morrison formula. In this embodiment, the first antenna combining circuit 50 may suppress the most dominant interference components within the constraints of the low computational power available to it.

In either embodiment, the first antenna combining circuit 50 transforms the N antenna signals output by the radio receiver circuits 40 into K virtual information streams, where each virtual information stream is a weighted linear combination of the N antenna signals. The K virtual information streams include reference symbols as well as user data symbols, for use in downstream processing. These data are transmitted to the second antenna combining circuit 60, which may in some embodiments be located with other baseband circuits of the receiver 10. The second antenna combining circuit 60 may consider the K virtual information streams to be signals from K new virtual antennas, with each virtual antenna pointing on a specific UE 20, but including interference from other UEs 20. The second antenna combining circuit 60 then performs antenna combining operations (preferably including interference suppression) on the K virtual antennas.

First, the second antenna combining circuit 60 also obtains radio channel estimates. In one embodiment, the second antenna combining circuit 60 estimates the radio channel between each UE 10 and antenna port in the antenna array 20 using known reference signals included in the K virtual antenna signals (or may share channel estimates utilizing known or estimated phase differences between antennas). In another embodiment, the second antenna combining circuit 60 may simply obtain the radio channel estimates from the first antenna combining circuit 50.

Once it has radio channel estimates, the second antenna combining circuit 60 preferably applies a suitable interference rejection algorithm to calculate a linear combination of K virtual antenna signals into L streams of user information, optimizing the SINR for each of the L streams. In general, for good performance, $K > L$, although no particular relationship is required (in one embodiment, discussed in greater detail below, $K = 2 L$). Since the second antenna combining circuit 60 is preferably located in the baseband section 14 of the receiver 10, it is assumed to have sufficient computational resources (e.g., power, processors, memory, and the like) to calculate the complex covariance matrix inversions required for a full IRC transform. Even so, the IRC complexity is significantly reduced from that of processing the N antenna signals, since only a KxK matrix must be inverted. Additionally, performance is improved, relative to a MRC-only solution, since the N signals giving rise to the K virtual antenna signals have already been combined in a manner that maximizes the received signal power on each received information stream.

The second antenna combining circuit 60 outputs the L streams of user information in parallel to a digital receiver 70, which performs conventional signal processing and logical operations such as decoding, decryption, error detection and correction, framing, and the like. The L user information streams are then processed conventionally by the wireless communication network.

The inventive approach of a first antenna combining circuit 50, e.g., performing MRC combining, and a second antenna combining circuit 60, e.g., performing IRC combining, is particularly suitable for application where, as described above, the first antenna combining circuit 50 is located in a radio portion 12 of a receiver 10, and hence has limited computational resources. However, physical separation of the first and second antenna combining circuits 50, 60 is not necessarily a limitation of the invention. In some embodiments, the two-stage approach to antenna combining may be beneficial even where both the first and second antenna combining circuits 50, 60 are located in the baseband section 14 of the receiver 10, as the first antenna combining circuit 50 may reduce the required IRC dimensions of the second antenna combining circuit 60. Those of skill in the art may optimally deploy the first and second antenna combining circuits 50, 60, and configure the specifics of the calculations performed by each, for any particular implementation, given the teachings of the present disclosure.

In one embodiment, the defined antenna combining transforms generated by the first and second antenna combing circuits 50, 60 are saved and provided to a transmitter for use in the downlink, assuming the same antenna array 30 is used for transmission. In a Time Division Multiple Access (TDMA) system, uplink and downlink transmissions channels are reciprocal from antenna to antenna.

Figure 3:
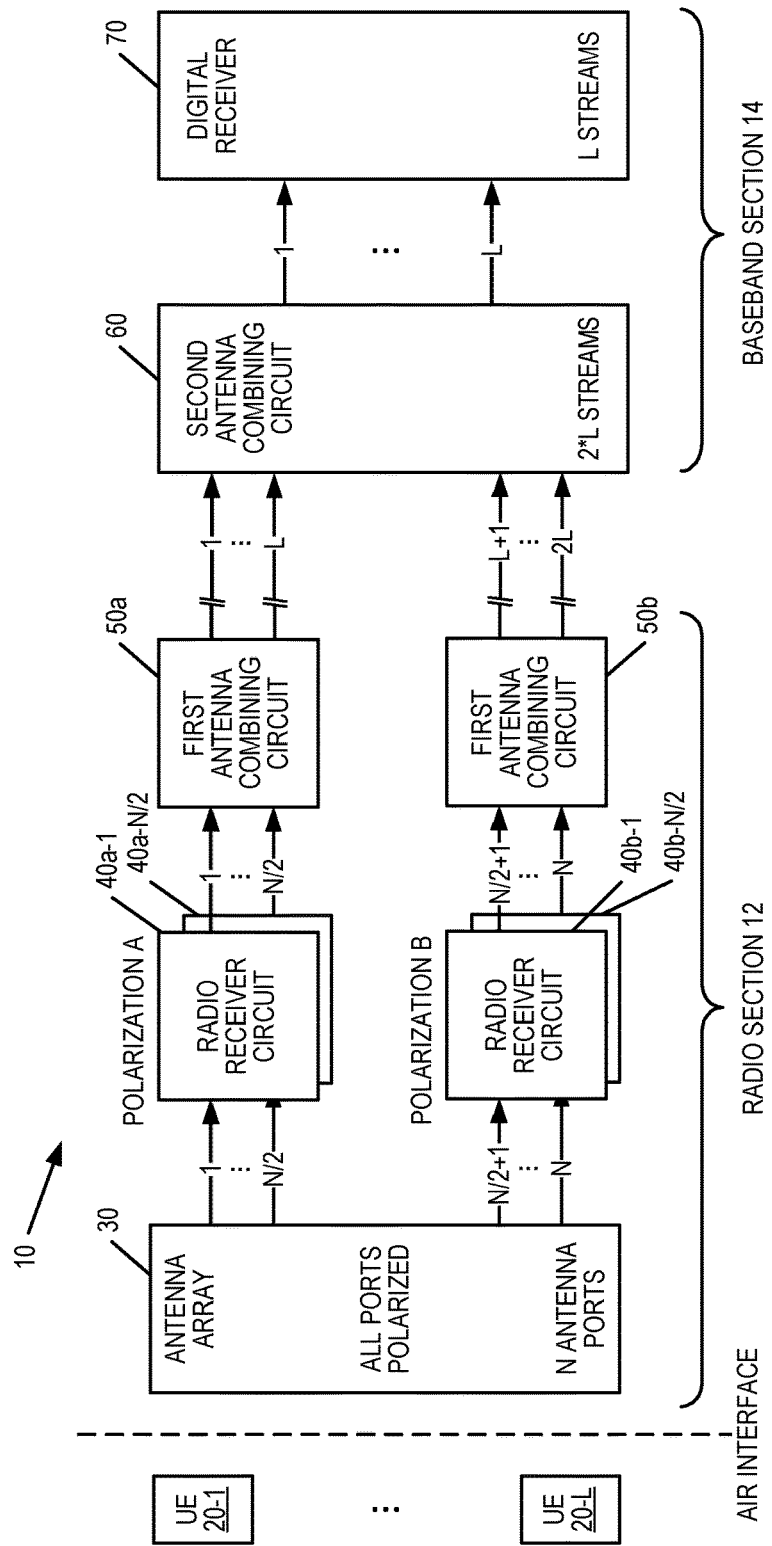
FIG. 3 is a functional block diagram of the receiver of FIG. 1 according to one embodiment, in which signals from polarized antenna elements are processed separately.

FIG. 3 depicts another embodiment of the wireless communication network receiver 10, which exploits polarization of antenna elements to improve performance. L UEs 20 transmits information streams which are received by an antenna array 30. In this embodiment, the antenna array 30 is split into two parts, each receiving a signals with a well-defined polarization direction (referred to herein as "a" and "b"). The radio receiver circuits 40 comprise two sets of circuits 40a and 40b, each of which receives outputs from antenna ports having the same polarization direction. That is, the N antenna port outputs are split between the two sets of radio receiver circuits 40a and 40b, such that set 40a receives antenna signals 1, 2, . . . , (N/2); and set 40b receives antenna signals (N/2)+1, (N/2)+2, . . . , N.

Similarly, the first antenna combining circuit 50 comprises two separate antenna combining circuits 50a and 50b. Outputs from each set of radio receiver circuits 40a, 40b are connected to the first antenna combining circuits 50a, 50b such that radio receiver circuits 40a, 40b processing antenna signals having the same polarization direction are connected to the same first antenna combining circuits 50a, 50b. In one embodiment, each first antenna combining circuit 50a, 50b transforms N/2 antenna signals into L virtual information streams—that is, K=2 L. In particular, the first antenna combining circuit 50a outputs virtual information streams 1, 2, . . . , L, and the first antenna combining circuit 50b outputs virtual information streams L+1, L+2, 2 L. The relationship K=2, while advantageous for one embodiment in which antenna elements have two polarization directions, is not a limitation of the invention. In general, K>L. In one embodiment, in each first antenna combining circuit 50a, 50b, radio channel estimates are used to perform MRC transforms by multiplying each received antenna signal with the conjugate of the corresponding radio channel and then integrating the signal over all antennas with the same polarization. Thus, two different virtual information streams are defined for each UE 20—one for each polarization direction.

In another embodiment, K=M*L, where M is a multiple of 2. In this case, MRC is not applied to signals from all antenna ports of a given polarization, but rather to, e.g., two groups of half each, in which case K=4 L. Higher values of M may be interesting in some cases, as it leaves more degrees of freedom for the following IRC computation.

Returning to the embodiment of FIG. 3, the K virtual information streams (in this case, K=2 L) are output to the second antenna combining circuit 60, which considers them as K virtual antenna signals, and performs a linear antenna combining algorithm, such as an interference rejection combining algorithm, to generate L user information streams. In this embodiment, the second antenna combining circuit 60 may exploit the polarization orthogonality of two of the virtual antenna signals for each UE 20 to improve the SINR of the L user information streams.

The second antenna combining circuit 60 outputs the L streams of user information in parallel to a digital receiver 70, which performs conventional signal processing and logical operations such as decoding, decryption, error detection and correction, framing, and the like. The L user information streams are then processed conventionally by the wireless communication network.

Figure 4:
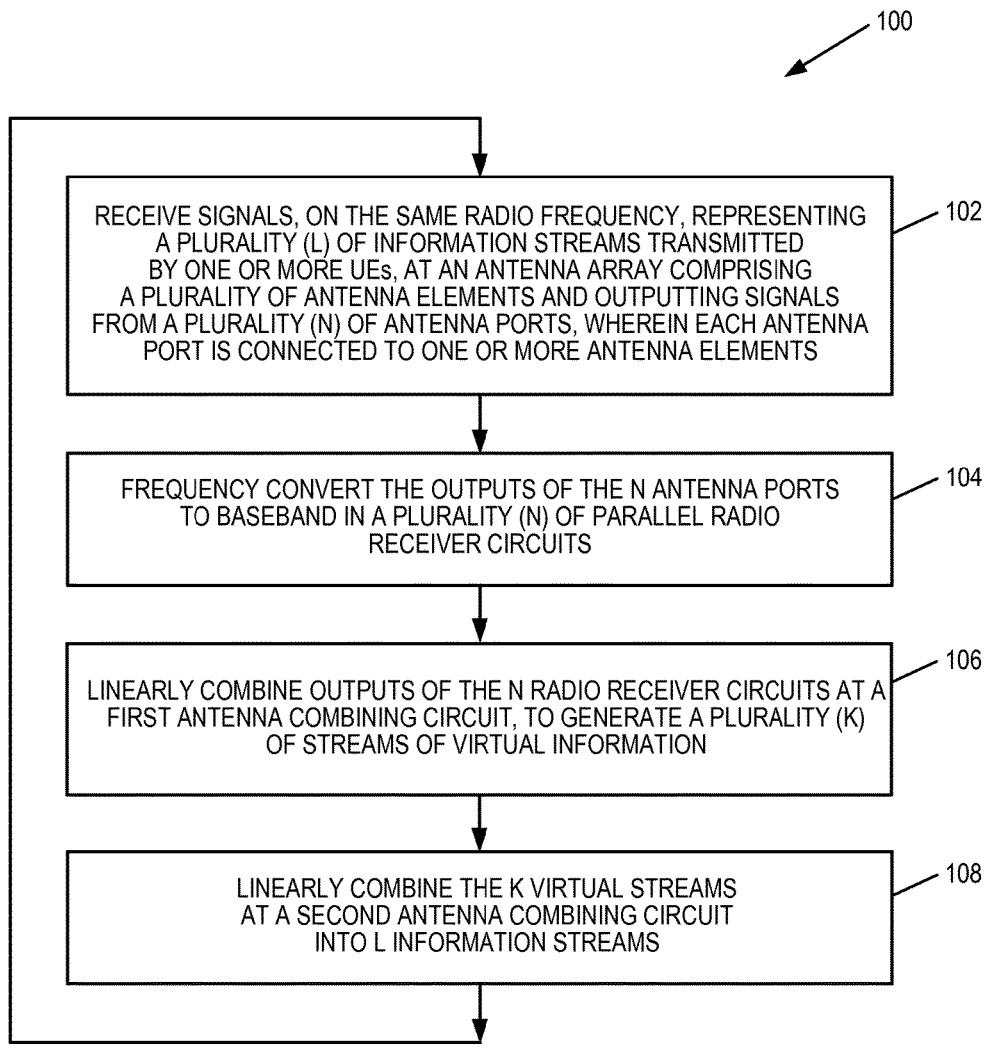
FIG. 4 is a flow diagram of a method of receiving and processing wireless communication signals.

FIG. 4 is a flow diagram depicting the steps of a method 100 of receiving and processing wireless communication signals from User Equipment (UE) in one or more nodes of a wireless communication network. The method 100 may be performed by an appropriate receiver 10 (which may comprise part of a transceiver). The receiver 10 may comprise a radio section 12 (see FIGS. 1 and 2) comprising an antenna array 30, N parallel radio receiver circuits 40, and a first antenna combining circuit 50. The receiver 10 may further comprise a baseband section 14 comprising a second antenna combining circuit 60 and a digital receiver 70. The radio and baseband sections 12, 14 of the receiver 10 may be physically spaced apart. In particular, the position of the radio section 12 may be dictated by requirements of the antenna array 30, and may be characterized as having limited computational resources. The position of the baseband section 14 may not be constrained by requirements of the antenna array 30, and may be characterized as having sufficient computational resources.

The method 100 begins when an antenna array 30 receives, on the same radio frequency and at a plurality of antenna elements, signals representing a plurality L of information streams transmitted by one or more UEs 20, and outputs signals from a plurality N of antenna ports, wherein each antenna port is connected to one or more antenna elements (block 102). In general, N>>L. In some embodiments, the plurality of antenna elements may comprises two pluralities of antenna elements, each having different, well defined polarization directions.

A plurality N of parallel radio receiver circuits 40 frequency converts (and otherwise processes) the outputs of the N antenna ports to baseband (block 104). In some embodiments, the plurality N of parallel radio receiver circuits 40 is divided into two sets, each set connected to a subset of the N antenna ports associated with antenna elements having the same polarization direction.

A first antenna combining circuit 50, which may in some embodiments be proximate to the N radio receiver circuits 40, linearly combines outputs of the N radio receiver circuits 40 to generate a plurality K of streams of virtual information (block 106). The first antenna combining circuit 50 may estimate radio channels between each UE 20 and antenna port using known reference signals, and may apply a relatively low complexity combining algorithm (e.g., MRC) to perform a weighted linear combination of the N antenna signals to K virtual information streams. In some embodiments, the first antenna combining circuit 50 comprises two first antenna combining circuits 50a, 50b, each receiving N/2 antenna signals from a respective set of radio receiver circuits 40a, 40b outputting signals having the same polarization direction. In this embodiment, each first antenna combining circuit 50a, 50b transforms N/2 antenna signals into L virtual information streams.

A second antenna combining circuit 60, which in some embodiments may not necessarily be proximate to the first antenna combining circuit 50, considers the K streams of virtual information to be K new virtual antenna signals, and linearly combines the K virtual antenna signals into L information streams (block 108). In some embodiments where antenna elements have distinct polarization directions, K=2 L, and the second antenna combining circuit 60 receives L streams of virtual information from each first antenna combining circuit 50a, 50b. In other embodiments, the number K of virtual information streams may be different than 2L. In some embodiments, K=M*L where M is a multiple of 2. The second antenna combining circuit 60 either computes radio channels from reference signals in the virtual antenna signals, or obtains the radio channels from the first antenna combining circuit 50. The second antenna combining circuit 60 may apply a relatively high complexity combining algorithm (e.g., IRC) to perform a weighted linear combination of the K new virtual antenna signals to L streams of user information.

Those of skill in the art will recognize that any of the radio receiver circuits 40, first antenna combining circuit 50, second antenna combining circuit 60, and digital receiver 70 may be implemented as dedicated hardware (e.g., in discrete logic, FPGA, ASIC, etc.); as programmable logic together with appropriate firmware; as one or more stored-program, general-purpose processors, such as a microprocessor or Digital Signal Processor (DSP), together with appropriate software; or any combination thereof. The circuits 40, 50, 60, 70 may be implemented on separate processors, or may be implemented as separate software modules executed on one or more shared processors. As known in the art, the software modules may be stored on any non-transitory, machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, RAM, DRAM, ROM, PROM, EPROM, Flash memory, solid state disc, etc.), or the like.

Embodiments of the present invention have been presented herein in the context of a receiver 10 operative in a base station of a wireless communication system, receiving and processing signals transmitted from UEs in the uplink. However, the invention is not limited to this application. For example, the invention may find utility in the receiver of a UE, receiving signals from the base station (and possibly other nodes) in the downlink. Furthermore, the invention is not limited to wireless communication systems at all, but may improve the operation of any receiver receiving signals from a plurality of transmitters.

Embodiments of the present invention present numerous advantages over the prior art. By portioning antenna signal combining into distinct steps, or phases, the overall antenna signal combining task may be assigned to different implementing circuits, where the circuits have different capabilities. The algorithms deployed at each step may be tailored to these different capabilities, such as the computational resources available. In this manner, the antenna signal combining task may be tailored to the hardware available, and optimized overall. In particular, the first antenna combining stage maximizes the received signal power on individual streams, and optionally applies low-complexity interference suppression. In embodiments where polarization direction of antenna elements may be exploited, each user information stream is split up into two virtual streams. The second antenna combining step then optimizes the SINR in all information streams. Additionally, by having the first antenna combining circuit estimate radio channels from reference signals received prior to user data, it can compute antenna combining transforms without the need to buffer user data in the radio section 12 of the receiver 10.

Allocating stages of antenna combining operations across the receiver 10 chain also reduces the amount of information that must be transferred down the chain. Embodiments of the present invention are estimated to reduce the complexity of information transfer over interfaces between hardware stages by a factor of N/K. Furthermore, the IRC computation in the second antenna combining circuit 60 is estimated to yield a complexity reduction of $(N/K)^3$. Embodiments of the present invention achieve good (although not optimal) performance at significantly lower cost than a full-complexity optimal combining solution. The performance loss is controlled by the number of rank-1 terms in the optional interference suppression operation in the first antenna combining circuit 50.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of receiving and processing wireless communication signals from User Equipment, UE, in a receiver operative in a wireless communication network, comprising:
   receiving signals, on the same radio frequency, representing a plurality (L) of information streams transmitted by one or more UEs, at an antenna array comprising a plurality of antenna elements and outputting signals from a plurality (N) of antenna ports, wherein each antenna port is connected to one or more antenna elements;
   receiving known reference signals transmitted from each UE;
   estimating a radio channel between each UE and at least one antenna port;
   frequency converting the outputs of the N antenna ports to baseband in a plurality (N) of parallel radio receiver circuits;
   linearly combining outputs of the N radio receiver circuits at a first antenna combining circuit, using the radio channel estimates, to generate a plurality (K) of streams of virtual information; and
   linearly combining the K virtual streams at a second antenna combining circuit into L information streams;
   wherein L, N, and K are natural numbers.

2. The method of claim 1, wherein N$\gg$L.

3. The method of claim 1, wherein each of the L information streams may comprise a data stream from a different UE, one of a plurality of data streams from the same UE, or a mixture of the two.

4. The method of claim 1, wherein the plurality of antenna elements comprises two pluralities of antenna elements, each having different, well defined polarization directions.

5. The method of claim 4, wherein the first antenna combining circuit comprises two antenna combining circuits, each combining signals from antenna elements having the same polarization direction.

6. The method of claim 5, wherein each first antenna combining circuit outputs L streams of virtual information, and K=2L.

7. The method of claim 5, wherein K=M*L where M is a multiple of 2.

8. The method of claim 1, further comprising modifying a radio channel estimate between a UE and a first antenna port by a known or estimated phase relationship to a second antenna port, and utilizing the modified channel estimate for the second antenna port.

9. The method of claim 1, wherein using the channel estimates to transform the N received antenna signals into K virtual information streams comprises using Maximum Ratio Combining to define different virtual streams per UE by multiplying each received antenna signal by the conjugate of the radio channel and then integrating the signal over all antennas with the same polarization.

10. The method of claim 1, wherein using the channel estimates to transform the N received antenna signals into K virtual information streams comprises suppressing one or more interference components in a low-complexity Interference Rejection Combining calculation by inverting a covariance matrix representing a limited number of interfering signals using a rank-1 update technique.

11. The method of claim 1, wherein the channel estimate and antenna combining transform are calculated using reference signals received prior to the receipt of user data.

12. The method of claim 1, wherein linearly combining the K virtual streams at a second antenna combining circuit into L information streams comprises:
obtaining channel estimates from each UE to each antenna port; and
applying an interference rejection algorithm to achieve a linear combination of K virtual streams into L information streams.

13. The method of claim 12, wherein obtaining channel estimates from each UE to each antenna port comprises receiving known reference signals transmitted from each UE, and estimating a radio channel between each UE and at least one antenna port.

14. The method of claim 13, further comprising modifying a radio channel estimate between a UE and a first antenna port by a known or estimated phase relationship to a second antenna port, and utilizing the modified channel estimate for the second antenna port.

15. The method of claim 12, wherein obtaining channel estimates from each UE comprises receiving from the first antenna combining circuit the channel estimates calculated by the first antenna combining circuit.

16. A receiver operative in a wireless communication network, comprising:
an antenna array comprising a plurality of antenna elements and outputting signals from a plurality (N) of antenna ports, wherein each antenna port is electrically connected to one or more antenna elements, the signals representing a plurality (L) of information streams transmitted by one or more UEs and known reference signals transmitted from each UE;
a plurality (N) of parallel radio receiver circuits, each connected to an antenna port and operative to frequency convert the output of the port to baseband;
a first antenna combining circuit operative to estimate a radio channel between each UE and at least one antenna port, and further operative to linearly combine the outputs of the N radio receiver circuits, using the radio channel estimates, to generate a plurality (K) of streams of virtual information; and
a second antenna combining circuit operative to linearly combine the K streams of virtual information into L information streams;
wherein L, N, and K are natural numbers.

17. The receiver of claim 16:
wherein antenna elements of the antenna array have two different, well-defined polarization directions; and
wherein the plurality (N) of parallel radio receiver circuits is divided into two sets, each set receiving the outputs of antenna ports connected to antenna elements having the same polarization direction; and
wherein the first antenna combining circuit comprises two first antenna combining circuits, each receiving the output of one set of parallel radio receiver circuits, such that each first antenna combining circuit combines antenna signals from antenna elements having the same polarization direction.

18. The receiver of claim 16, wherein each first antenna combining circuit combines N/2 antenna signals into L virtual information streams, and K=2L.

19. The receiver of claim 16, wherein K=M*L where M is a multiple of 2.

* * * * *